United States Patent [19]

Tonner

[11] Patent Number: 5,306,428
[45] Date of Patent: Apr. 26, 1994

[54] METHOD OF RECOVERING ENERGY FROM REVERSE OSMOSIS WASTE STREAMS

[76] Inventor: John B. Tonner, 10201 N. Concord Dr., Mequon, Wis. 53092

[21] Appl. No.: 968,318

[22] Filed: Oct. 29, 1992

[51] Int. Cl.$^5$ .............................................. B01D 61/06
[52] U.S. Cl. .................................. 210/652; 210/137; 210/321.66; 210/424
[58] Field of Search ............... 210/637, 652, 130, 134, 210/135, 136, 137, 257.2, 321.6, 416.1, 416.3, 321.66, 424; 417/374, 393, 403; 137/625.23, 625.47, 213

[56] References Cited

U.S. PATENT DOCUMENTS

| | | | |
|---|---|---|---|
| Re. 33,135 | 12/1989 | Wanner et al. | 210/416.3 |
| 3,369,667 | 2/1968 | Clark et al. | 210/321.66 |
| 3,558,242 | 1/1977 | Jenkyn-Thomas | 417/374 |
| 3,791,768 | 2/1974 | Wanner | 417/393 |
| 4,124,488 | 11/1978 | Wilson | 210/134 |
| 4,187,173 | 2/1980 | Keefer | 210/136 |
| 4,367,140 | 1/1983 | Wilson | 210/134 |
| 4,434,056 | 2/1984 | Keefer | 210/416.1 |
| 4,632,754 | 12/1986 | Wood | 210/321.66 |
| 4,973,408 | 11/1990 | Keefer | 210/321.66 |
| 4,983,305 | 1/1991 | Oklejas et al. | 210/321.66 |
| 5,102,543 | 4/1992 | Burroughs | 210/424 |

Primary Examiner—Joseph W. Drodge

[57] ABSTRACT

Hydraulic energy is recovered from the waste brine through a control device, having a central rotatable spool piece controlling fluid flow paths therethrough. The control device, in turn, directs the brine stream of reverse osmosis systems by diverting the brine into work exchangers used to pressurize the feed liquor. All components are made of corrosion resistant materials suitable for use in brine environments. Membrane pressure is held stable by equalization lines within the control device. System capacity can be adjusted externally by changing control dwell time.

10 Claims, 7 Drawing Sheets

METHOD OF RECOVERING ENERGY FROM REVERSE OSMOSIS WASTE STREAMS

BACKGROUND OF THE INVENTION

The present invention relates to a method of improving the efficiency /f reverse osmosis systems by transferring the energy of a waste stream providing useful work in the process. More specifically, the present invention relates to a method of using waste brine to pressurize feed liquor.

PRIOR ART

When a semi-permeable membrane divides two fluids of different salinities, osmosis occurs. To achieve equilibrium of the chemical potential across the membrane, liquid flows through the membrane into the more concentrated solution. This flow will continue until concentrations on either side of the membrane are equal, unless the osmotic pressure is reached. The osmotic pressure can be viewed as the static head that is reached (due to the rising level on one side of the membrane) resulting in zero flow through the membrane.

Any pressure that is applied in addition to the osmotic pressure, will cause the osmosis to reverse. With the flow reversed, liquid (also known as permeate) flows from the more concentrated side of the membrane. Practical systems can be designed with an operating pressure above the osmotic pressure which result in desalted permeate being produced from a saline feed stream. It is in this manner that brackish or seawaters are desalted by Reverse Osmosis.

Figure 1:
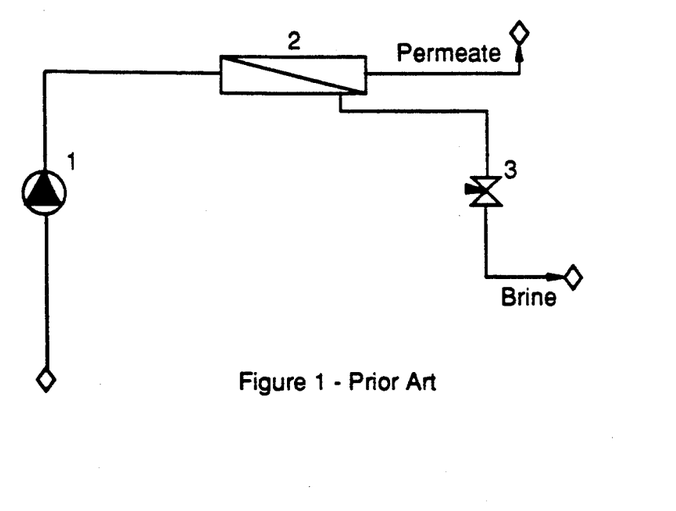

The osmotic pressure is a colligative property of the fluids being processed and is dependent on the concentrations of salts and minerals in the fluid. For seawater, the osmotic pressure is approximately 25 kg/cm2. Presently commercial membranes operate at approximately 70 kg/cm2. There are limits on the permissible concentration of salts within the membranes. Supersaturation of salts may result in deposition of salts on the membrane and increased concentrations have higher osmotic pressures. Commercial designs are based upon an acceptable compromise (FIG. 1). For seawater the permeate flow is normally 40–45% that of the feed liquor and is referred to as RECOVERY.

Improving the efficiency of the process can be achieved by recovering energy from the high pressure waste brine. Traditional methods of energy recovery are;

a/ Impulse Turbines (Pelton Wheels); with unit efficiencies of around 75%.

b/ Reaction Turbines (Reverse Running Pumps); with unit efficiencies of less than 68%.

c/ Other energy recovery devices are of the work exchanger type.

The present invention is a work exchanger type. Typically, these devices, such as those in U.S. Pat. No. 3,791,768 use opposed piston/diaphragm pumps. Such arrangements have several drawbacks. Primarily, the device defined by U.S. Pat. No. 3,791,768 is restrictive in the amount of fluid which can be handled and the equipment is best suited to relatively small installations.

Figure 2:
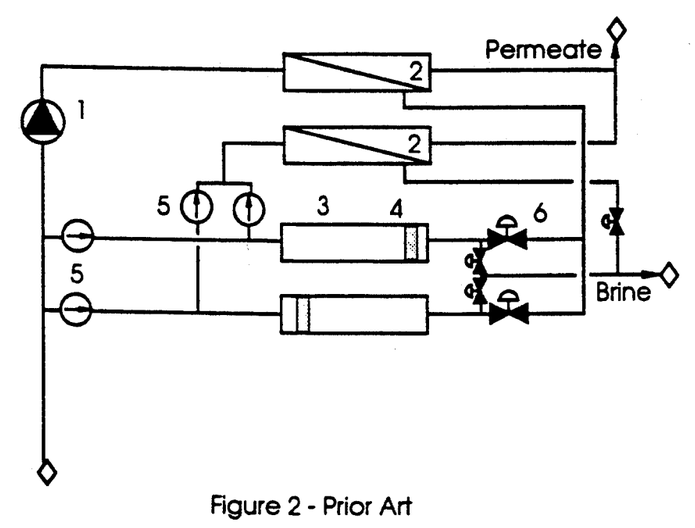

Other energy recovery devices employ pistons of different areas with connecting rods. Such a device is detailed in U.S. Pat. No. 3,558,242. This type of device requires various seals to minimize fluid leaks to atmosphere. A more practical solution for producing large quantities of permeate was utilized by Aqua Design Inc., of California. A sliding piston and rod arrangement is utilized to obtain the pressure differential (FIG. 2).

Figure 3:
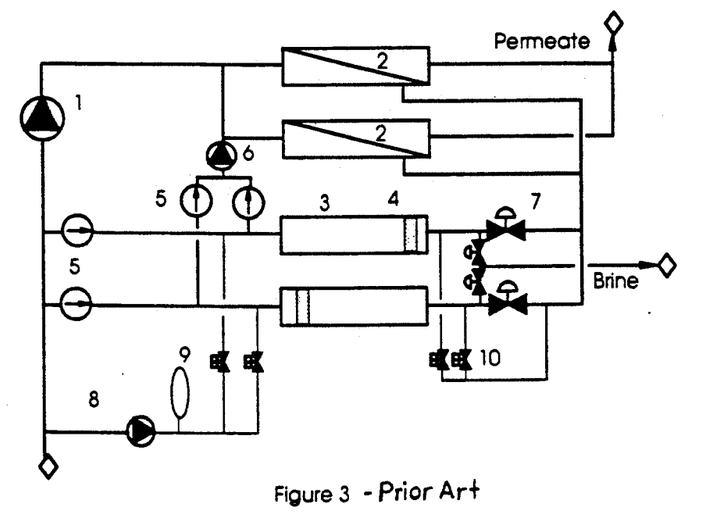
FIG. 3 In this case the practical problems of maintaining sliding seals between the rod and the vessel, and across the piston, are removed. The feed liquor pumped by the brine stream must be further boosted by a pump (to overcome the pressure losses of the brine as it passed through the membrane vessel).

A further practical improvement to this system was developed by Aqua Design, and Reliable Water Co., of Massachusetts. Relinquishing the sliding piston rod and relying on a booster pump offered practical improvements via the removal of several mechanical sealing requirements (FIG. 3). No device is known, however, which further accomplishes control simplification and process enhancement. Whatever the precise merits, features and advantages of the above cited references, none of them achieves or fulfills the purposes of the present invention.

SUMMARY OF THE INVENTION

The principal object of the invention is to provide a device for use in recovering energy from waste brine streams and delivering said energy as useful work to the process. Further, the device and system must be practical for use in continuous commercial treatment of salt streams.

Other objectives of the present invention are; to provide a system which can be retroactively installed in existing reverse osmosis processes and can easily be controlled. Another object is to improve the longevity of reverse osmosis membranes. A further object is to reduce the operational costs of reverse osmosis systems. It is also an objective of the invention to allow expansion of reverse osmosis systems via use of the invention and also provide energy recovery abilities thereby improving both capacity and efficiency.

Figure 4:
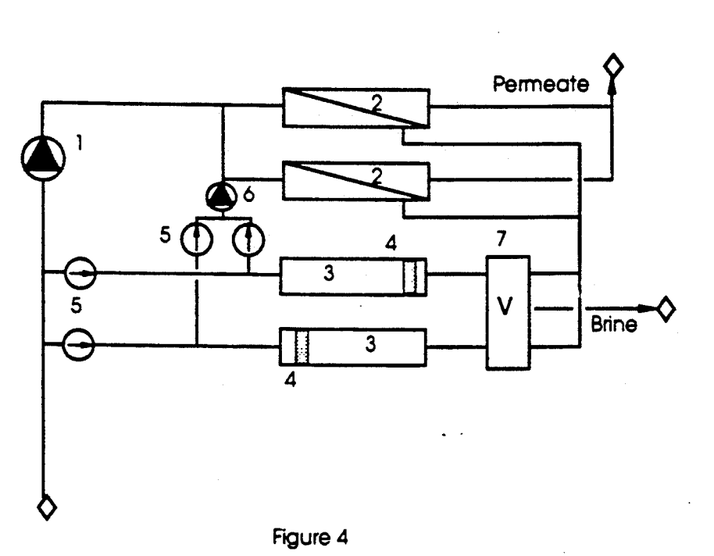

The foregoing objectives can be accomplished by providing an energy recovery device which reduces the complexity of the system shown in FIG. 3 and follows the process as shown in FIG. 4.

Use of the high pressure brine to pressurize the work exchangers can be accomplished via controlled pressurization. This removes maintenance items such as the pressurization pump and pressurization control valves. Use of a spool valve improves hydraulic flow in and out of the work exchanger and reduces the number of control devices, from systems such as shown in FIGS. 2 and 3.

A specifically designed spool can also be used to pressurize the work exchanger via equalization ports. Further, these ports will also act as depressurisation systems to smoothly reduce work exchanger pressure.

Use of work exchange cylinders to recover brine energy provides higher hydraulic efficiency than either reaction or impulse turbines. Membrane systems can, therefore, be designed to operate at commercially attractive rates of power consumption. Use of work exchangers results in membrane systems where the flow through rotary driven high pressure pumps is equal to the permeate flow rate. Additional feed liquor is pumped by the brine flow via the work exchange cylinders, and boosted as required to overcome the pressure losses associated with brine flow through the membranes and pipework. This reduces the size of high pressure pumps and drivers /ver those required by impulse or reaction turbine energy recovery systems, and also ensures lower specific power consumption (kWh per tonne of permeate).

Conversely, the invention can be used to improve operational costs while operating at the same specific power consumption as a traditional (impulse or reaction) turbine system. Due to the higher efficiency of work exchange energy recovery, systems can be designed that utilize lower membrane recovery rates. While this results in a need for more membranes for any given permeate flow rate, it also improves membrane life. This allows another factor to be optimized in the design of reverse osmosis systems, improving overall economics (turbine based systems are often optimized by reducing the amount of energy in the brine stream via reduction of that stream through higher recovery rates, resulting in premature degradation of the membranes). The key to the success of this optimization lies in continued improvements in energy recovery efficiency, such as offered by the present invention.

The invention also results in an energy recovery system which can be retroactively installed to existing reverse osmosis processes with the benefit of increasing system capacity and improving energy consumption. Use of work exchanger cylinders to pump a portion of the feed liquor reduces the high pressure pump flow rate to an amount equal to the permeate flow rate. Thus, if a given reverse osmosis system is to be expanded via use of the invention the existing high pressure pumps can be utilized even though total feed liquor flow is increased.

BRIEF DESCRIPTION OF DRAWINGS

FIG. 1 This schematic shows a basic reverse osmosis system. Saline feed liquor is pumped to a pressure above the fluid's osmotic pressure and introduced to the semipermeable membranes. The membranes produce a lower salinity permeate stream by the reversed process of osmosis. A more saline brine stream is rejected from the membrane and discharged to waste via a control valve. The control valve reduces the energy of the brine stream by converting the fluid's pressure energy to noise and vibration.

FIG. 2 In this schematic, brine stream energy is recovered via a work exchanger. The differential piston area overcomes the pressure drop, associated with flow through the membrane vessel, to ensure the feed liquor is adequately pressurized. Sliding seals are required to maintain differential pressure across the piston, and to seal the piston rod penetration of the cylinder.

FIG. 4 This is a schematic of the invention process. The problems associated with process failure due to malfunction of the pressurization system mechanical components (shown in FIG. 3), is removed via the use of equalization ports. Depressurisation of the work exchangers is also achieved with low maintenance equalization ports further improving performance. The use of equalization techniques improves the stability of the brine, and hence membrane, operating pressure. Membranes subjected to cyclic pressure fluctuations have shorter operational lifetimes. By improving pressure stability plant longevity can be increased.

FIG. 6 This shows a cross-section of a preferred embodiment of the invention. Connections between the inlet and outlet ports and the work exchanger cylinders are clearly shown. Equalization lines are incorporated into the spool piece to facilitate pressurization of the work exchanger cylinders using brine pressure. The cylinders are depressurized in the same manner.

DETAILED DESCRIPTION

As shown in FIGS. 4-7, the energy recovery control device directs the pressure of a waste brine from reverse osmosis membrane(s) (2) to pressurize a feed stream (or feed streams) that are pressurized via high-pressure pump (1) and booster pump (6) to the membrane(s) inlet(s). A control device (7) having a control device shell (14) is manufactured from materials resistant to corrosive brine streams, preferably super austenitic or duplex stainless steel. A central spool piece (11), machined from any non corrosive material is free to rotate within the shell. The spool is rotated via a control shaft (13) which enters the device through a seal (15).

High pressure brine enters the device via the inlet port(s) (12) and flows through the spool into the recovery cylinders (3). The recovery cylinders are manufactured from corrosive resistant materials, such as fibre reinforced plastic or resins or suitable stainless steels. The brine pressure acting upon the pistons (4) in the cylinder forces the pistons forward which in turn causes the feed liquor to exit the cylinder via the outlet check valves (8).

The spool is held in this position during the cylinder power stroke. After the power stroke, the spool is rotated slowly through 90 degrees. As the spool turns, equalization port(s) (9) allows the cylinder pressure to drop in a controlled manner. In the next dwell position, the cylinder is in an exhaust stroke. Internal passages in the spool now connect the cylinder to an outlet port (10). check or non-return valves (5) now allows low pressure feed liquor to push the piston (4) backwards and force the brine out through the outlet port (10).

Figure 5:
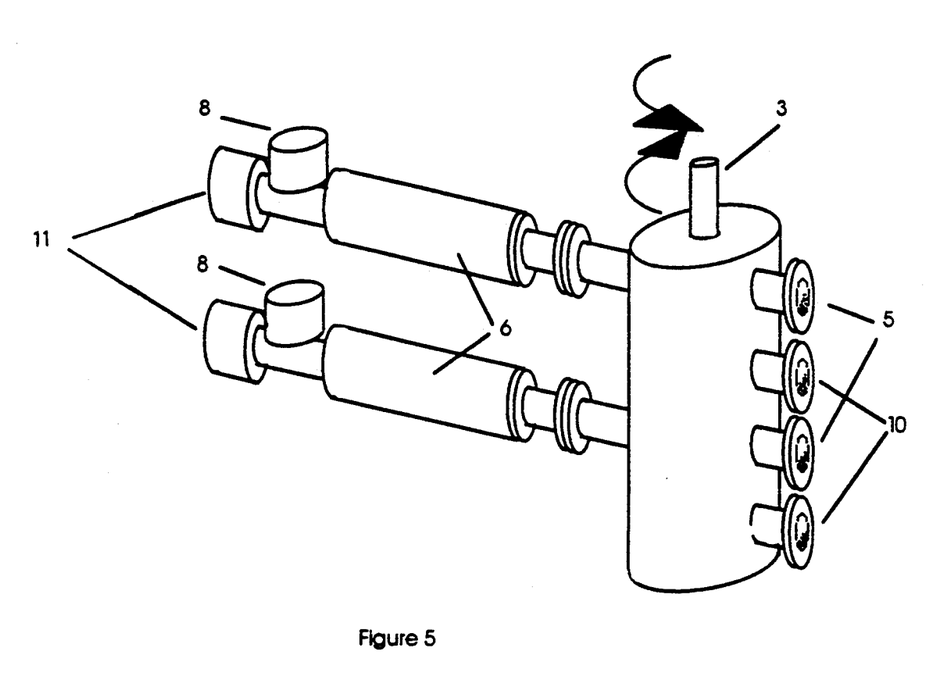
FIG. 5 This figure is an isometric perspective of a preferred embodiment of the invention as detailed herein. Brine transfer ports and equalization lines are incorporated into a spool within the main control assembly.
Figure 6:
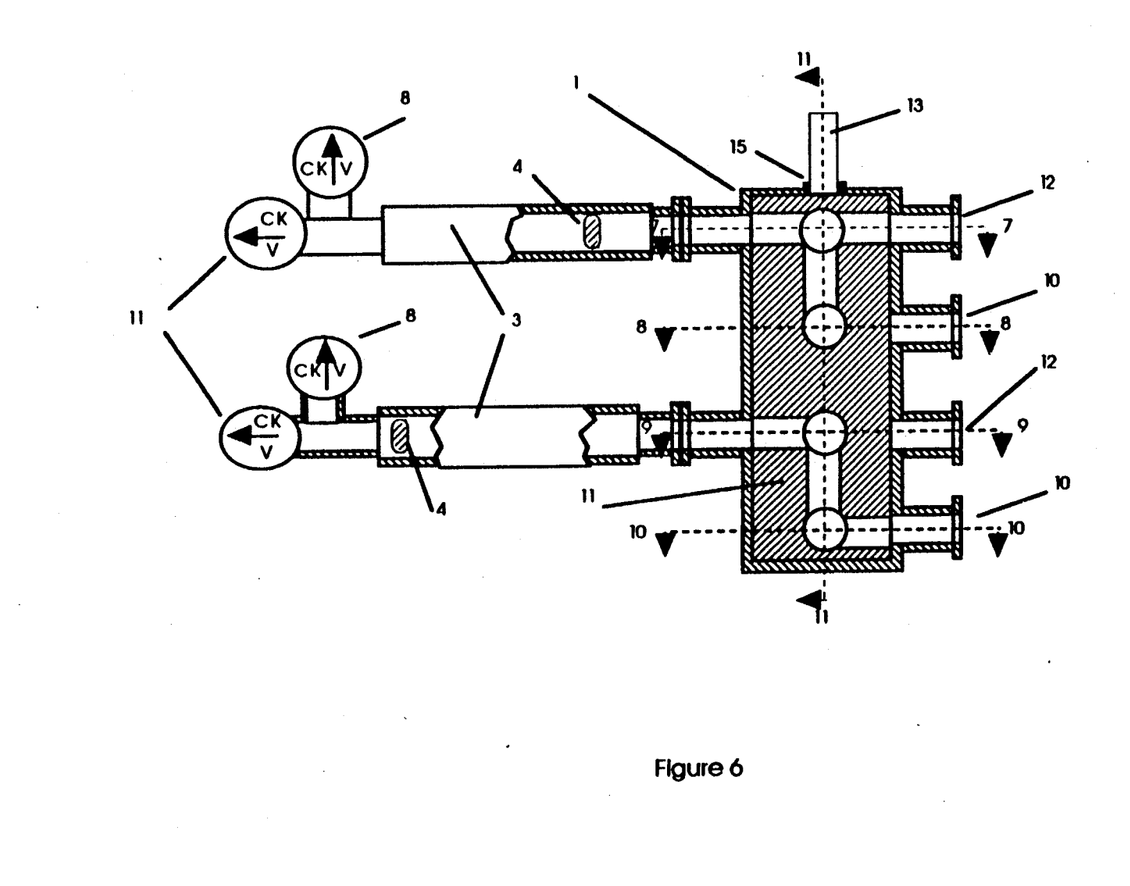
Figure 7:
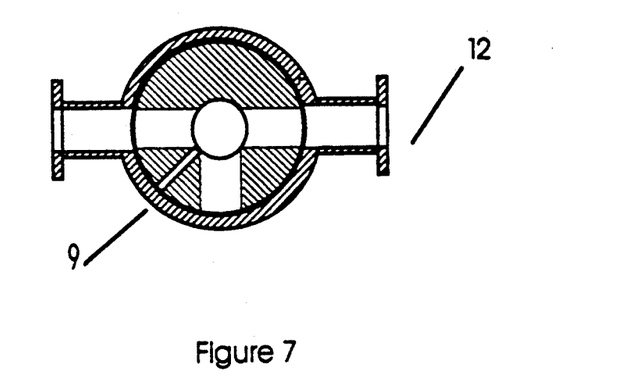
FIG. 7 Further details internal cross-sections of this embodiment of the invention.

After completion of the exhaust stroke, the spool rotates back through 90 degrees. As the spool turns, equalization port(s) (9) raise the pressure of the cylinder in a controlled manner. As the cylinder pressure rises, the inlet non-return valve (5) closes. When the spool reaches the dwell position the power stroke begins again. FIGS. 4, 5 and 6 show how two cylinders can be controlled in this manner effectively operating as a duplex positive displacement pump. Several such devices can operate in parallel to produce multiplex pump arrangements, or single control devices can be configured to the same end with multiple cylinders.

In use the capacity of the device can be regulated by adjusting the dwell time in any one position. Control of the spool piece is achieved by commercial valve actuators that control shaft (13). Adjustment of the dwell time is via simple timer control of the actuator(s). Speed of rotation is a function of a valve actuator and can be used to smooth pressure transitions via control of the equalization time interval. Pressure fluctuations are a function of the configuration of the device. Use of more cylinders in operation result in more stable pressure, as expected from positive displacement pump theory and experience.

The invention also results in an energy recovery system which can be retroactively installed to existing reverse osmosis processes with the benefit of increasing system capacity and improving energy consumption. Permeate production cannot be increased beyond the recovery limit of commercially available membranes so membranes must always be added to increase production. The high pressure pumps of a traditional reverse osmosis system with turbine based energy recovery, pump a flow of feed liquor which is equal to the permeate flow rate divided by the membrane recovery. For seawater reverse osmosis systems operating at 45% recovery the high pressure pumps handle 2.22 times the permeate flow rate. At 33% recovery this rises to three times the permeate flow rate. Use of work exchanger cylinders to pump a portion of the feed liquor reduces the high pressure pump flow rate to an amount equal to the permeate flow rate. Thus, if a given reverse osmosis system is to be expanded via use of the invention the existing high pressure pumps can be utilized even though total feed liquor flow is increased. For seawater systems, existing pumps could successfully be used in permeate expansion systems of between 225 and 333%. This greatly reduces the amount of ancillary 7/rk required to complete the expansion.

During the life of the membranes, compaction (and other processes) result in decreased performance (production of permeate). The ability of the invention to adjust the capacity of pumped fluid, via adjustment of dwell time, results in improved reverse osmosis system efficiency. The energy recovery can be adjusted to match the membrane recovery very closely throughout the life of the facility. This cannot be as readily achieved with turbine based systems where pressure is increased to compensate for degradation. The invention ensures that specific power consumption is improved throughout the life of the membranes, because work exchange energy recovery efficiency is higher and is now operating in a regime of increasing brine flows.

I claim:

1. A method of improving the energy efficiency of operation of a reverse osmosis system by recovering and transferring energy from at least one fluid waste stream of the system to at least /ne fluid stream of feed liquor being pumped into the system through transfer of fluid pressure using at least one work exchange cylinder and controlling paths of flow of the fluid streams by means including rotation of at least one valve spool piece that is fluidly connected to the at least one work exchange cylinder.

2. The method of claim 1, wherein the at least one spool piece forms a part of at least one multi-port control device.

3. The method of claim 2, further comprising the providing of means to adjust dwell time durations of the at least one multi-port control device in preset positions, and allowing compensation for degrading membrane performance over time in the reverse osmosis system.

4. The method of claim 1 wherein the at least one spool piece and at least one work exchange cylinder form a part of a modular system allowing retrofitting into existing reverse osmosis systems not having energy recovery systems.

5. The method of claim 1, wherein equalization lines or passages are provided within the at least one valve spool piece.

6. The method of claim 5 wherein the equalization lines or passages are effective in pressurizing and depressurizing the at least one work exchanger.

7. The method of claim 6, wherein the pressurizing and depressurizing are controlled by speed of rotation of the at least one spool piece.

8. The method of claim 1 wherein the improving of energy efficiency is effective to allow an expanded membrane array of the reverse osmosis system.

9. The method of claim 8, wherein the allowed expanded membrane array does not require replacement of high-pressure pump or pumps existing to expand reverse osmosis system capacity.

10. The method of claim 1, wherein additional flow control valves are provided to control flow rates and flow paths of flow of the fluid streams.

* * * * *